Sept. 22, 1942.   N. MILLER   2,296,292
COMBINED EXPOSURE METER AND RANGE FINDER
Filed April 1, 1940   5 Sheets-Sheet 1

Inventor
Nicholas Miller
By [signature]
Attorney

Sept. 22, 1942.  N. MILLER  2,296,292
COMBINED EXPOSURE METER AND RANGE FINDER
Filed April 1, 1940  5 Sheets-Sheet 2

Inventor
Nicholas Miller
By
Attorney.

Sept. 22, 1942.    N. MILLER    2,296,292
COMBINED EXPOSURE METER AND RANGE FINDER
Filed April 1, 1940    5 Sheets-Sheet 3
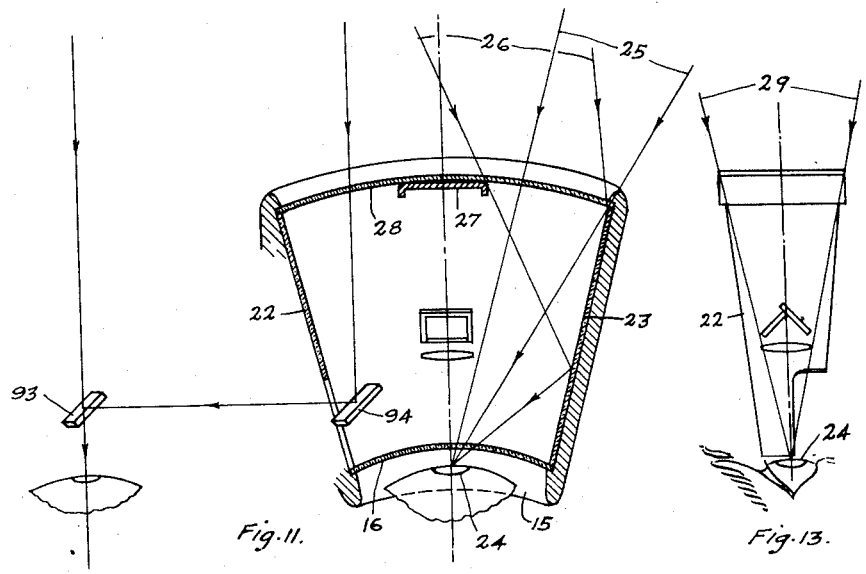
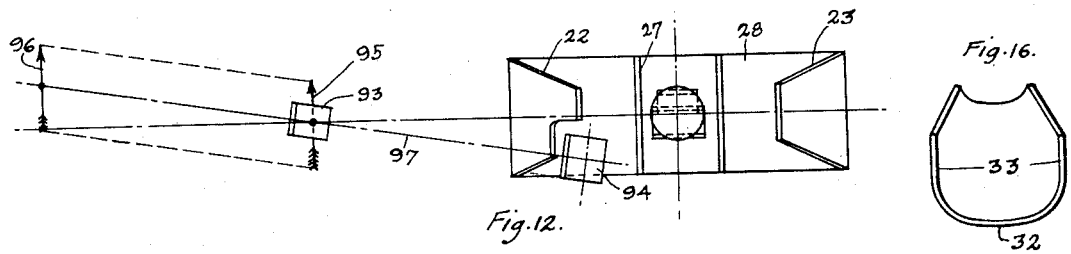
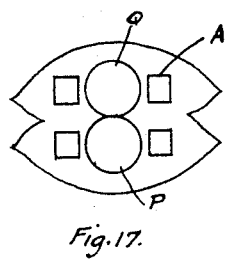
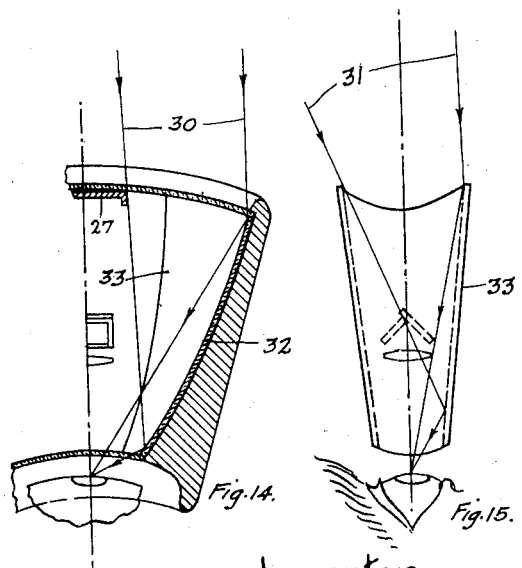
Inventor
Nicholas Miller
By J. Jochum
Attorney Sept. 22, 1942.  N. MILLER  2,296,292
COMBINED EXPOSURE METER AND RANGE FINDER
Filed April 1, 1940  5 Sheets-Sheet 4

Inventor
Nicholas Miller
By
Attorney

Sept. 22, 1942.  N. MILLER  2,296,292
COMBINED EXPOSURE METER AND RANGE FINDER
Filed April 1, 1940    5 Sheets-Sheet 5

Inventor
Nicholas Miller
By ~~~ Attorney

Patented Sept. 22, 1942

2,296,292

UNITED STATES PATENT OFFICE 2,296,292

COMBINED EXPOSURE METER AND RANGE FINDER

Nicholas Miller, Berwyn, Ill.

Application April 1, 1940, Serial No. 327,238

17 Claims. (Cl. 88—23)

In my pending application, Serial #274,090, filed May 17, 1939, an exposure meter is disclosed, for the determination of light intensities by the measurement of the pupillary diameters of the human eye, as it is affected by the light falling upon it. In the present invention improvements are provided whereby the light rays which reach and influence the pupil of the eye, are definitely limited to a field of rays, which correspond to the field covered by the camera objective. The effect of this restricted light field upon the pupillary opening is that produced by the average of the light intensities proceeding from all points of the object field, so that by this means the proper exposure required by any given scene may be accurately determined.

Another improvement consists of fixed reflectors positioned in such a way, that light rays proceeding from the object field are intercepted by said reflectors, and directed upon the eye, so that the light falling upon the pupil is sufficient to produce pupillary images which may be clearly observed even in dim light.

A further improvement consists of a focusing means whereby the image forming lens and reflectors are adapted to be shifted in an axial direction, so that the instrument can be adjusted to yield sharp pupillary images either for normay or for defective vision, and this is accomplished without changing the position of the instrument relative to the observer's eye. A vision dial is provided with a scale, for setting the instrument corresponding to near vision, normal vision, and far vision; intermediate positions are also indicated so that the instrument may be preset, if desired.

For calibrating the instrument an adjustable screw is provided with graduation marks, and by means of this screw, the angular relation between the image forming reflectors may be altered to correspond to the individual variation of the pupillary diameters.

Another improvement consists of a simple range finder functionally combined with the exposure meter, and so positioned with respect to the exposure meter, that the two eyes are simultaneously employed, one eye for viewing the range finder images, and the other for observing the pupillary images. The two viewing openings or apertures are spaced apart to correspond approximately to the distance between the eyes, so that both of the above functions may be performed without changing the position of the instrument. It is well known that the proper exposure of a scene depends not only upon the illumination of the scene, but also upon the distance of the objects in the scene from the objective of the camera; the nearer the objects are to the camera the greater will be the exposure required, this effect being particularly pronounced for relatively near objects, when estimated in terms of the focal length of the camera objective.

Accordingly co-operative connection is provided between the range finder and the exposure meter, so that the exposure time relative to the "stop" or aperture opening of the camera objective, as indicated on the instrument, results from the combined action of taking the range, and operating the exposure meter. Since the effect of the distance of an object upon the exposure depends upon the focal length of the camera, adjustable means are provided, in the form of an indicator with respect to a scale of focal lengths, whereby the instrument can be adjusted or set, to correspond to the focal length of the camera objective.

Another object of the invention is to adapt the combined exposure meter and range finder directly to the camera in such a way that the shutter and the iris diaphragm of the camera objective will be coordinated through the operation of the exposure meter, and the positioning of the camera objective relative to the sensitized film is obtained by the operation of the range finder; there is further provided a co-operative connection between the range finder and the shutter and iris diaphragm control mechanism, for influencing their relationship in accordance with the distance of the object as above explained.

To the attainment of these ends and the accomplishment of other new and useful objects as will appear, the invention consists in the features of novelty in substantially the construction, combination and arrangement of the several parts, hereinafter more fully described and claimed and shown in the accompanying drawings, and in which Figure 1 represents an enlarged top view of the instrument with the exposure meter and range finder dials removed to more clearly show the construction.

Figure 11 is a schematic horizontal section showing the path of rays to the exposure meter and the range finder.

Figure 12 is a partial front elevation of Figure 11.

Figure 13 is a partial side view of Figure 11.

Figure 14 is a partial schematic sectional view similar to Figure 11 showing the reflection of rays from a parabolic type reflector.

Figure 15 is a partial side view of Figure 14.

Figure 16 is an end view of the reflector shown in Figure 15.

Figure 17 is a diagrammatic view showing the appearance of the images of the eye and of the pupillary images.

Figure 1:
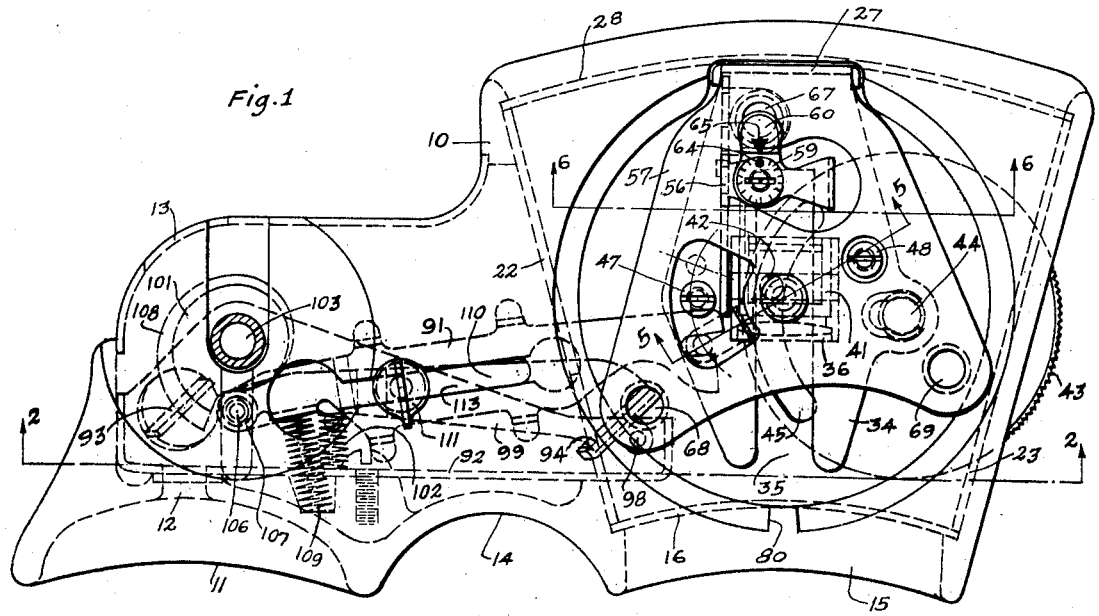
Figure 2:
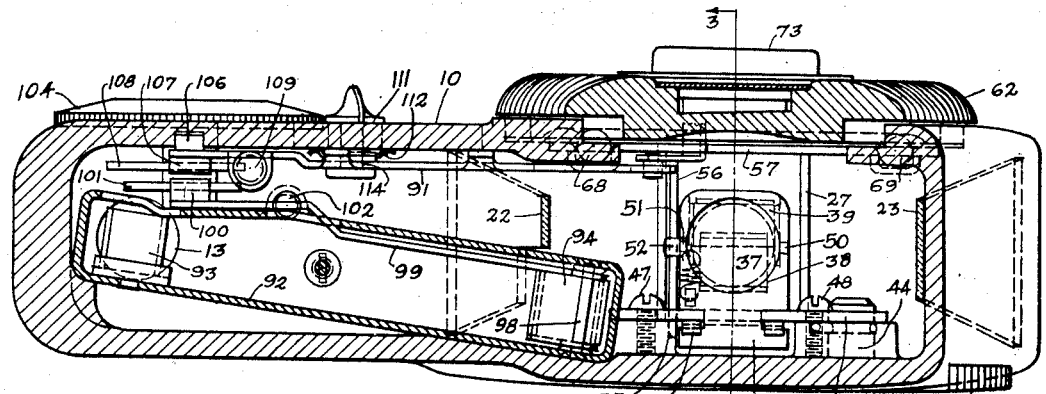
Figure 2 is a sectional view taken along line 2—2 Figure 1.
Figure 3:
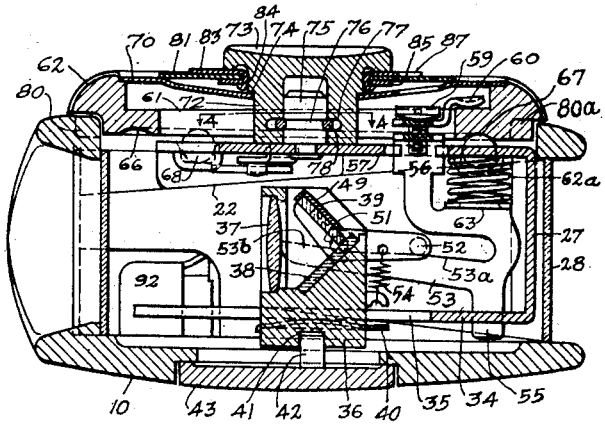
Figure 3 is a sectional view taken along line 3—3 Figure 2.
Figure 7:
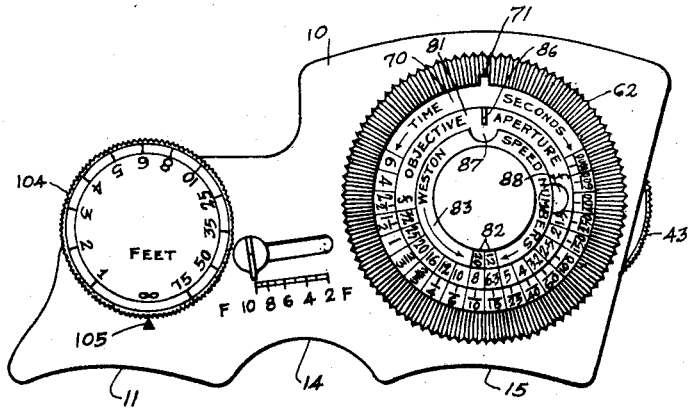
Figure 7 is a top view of the instrument showing the exposure meter and the range finder dials in position.
Figure 8:
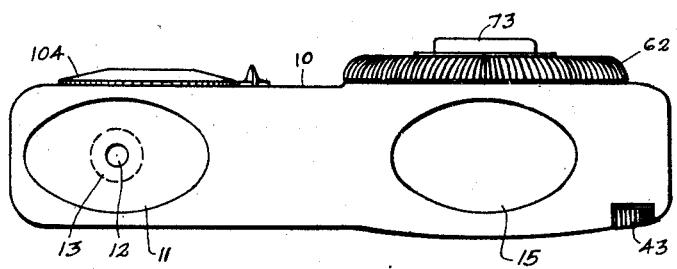
Figure 8 is a front elevation of Figure 7.

In Figures 1, 2 and 3, the numeral 10 represents a casing which is made preferably of a plastic material such as Bakelite. Inside this casing are mounted the component parts of the exposure meter and of the range finder. One end 11 of the casing is oval shaped to fit about the left eye, Figures 1, 7 and 8, and is provided with an aperture 12, for the viewing of the range finder images; directly opposite the aperture 12, a larger aperture 13 is provided in the casing, to serve for the entrance of the rays for observing the object, Figures 1, 2 and 8. These apertures are preferably sealed against the entrance of dust and dirt with transparent glass or transparent plastic material. A semicircular indention 14, Figures 1 and 7, provides clearance space for the nose when using the instrument. Adjacent to the indention 14, the right side of the casing is likewise provided with an oval shaped opening 15, Figures 1, 7 and 8, adapted to accommodate the right eye, which is used in operating the exposure meter.

A transparent arcuate member 16 is provided to seal the oval opening, and to allow the light rays to pass to illuminate the pupil of the eye. On the two sides of the oval shaped opening are positioned the reflectors 22 and 23, Figures 1, 2, 3, 11, 12 and 13. The right eye and its pupil is shown schematically in Figures 11 and 13 at 24; the numeral 25 represents the direct rays which reach the center of the pupil, and 26 represents the rays reflected by the reflector 23 reinforcing the direct rays in illuminating the pupil. These groups of rays 25 and 26 illustrate how the available rays are limited to a definite angle by the edge of the casig on the right side, and by the upright part of the frame member 27 on the left side of the opening. The numeral 28 is an arcuate transparent member for sealing the openings on the two sides of the upright frame member 27.

A similar group of rays (not shown) reaches the pupil through the opening on the left side of the member 27. In Figure 13, 29 shows the limitation of rays in a vertical plane, so that when the instrument is pointed at an object, sky light will be excluded from reaching the eye. In Figure 14 a parabolic reflector further restricts the angle of the reflected rays, since those that reach the center of the pupil are the parallel groups of rays 30.

In Figures 14, 15 and 16 the reflector 32 is shown provided with flanges 33 so that a transverse section of the mirror is U shaped as appears from the end view, Figure 16.

In Figure 15, rays 31 show the flanges 33 reflecting rays to the pupil which, however, are limited to a small angle. These rays are additional to the direct rays which reach the pupil, as shown at 29, Figure 13. The operation of the exposure meter depends upon the response of the pupil opening to the stimulus induced by the light which is incident upon the eye. This response is measured by means of two enlarged virtual images of the illuminated pupil, formed by a lens and double reflector combination, the principles of which are fully explained in my aforementioned pending application.

In the present invention the lens and reflectors are movable axially toward or away from the pupil in order to obtain a sharp outline of the pupillary images, corresponding to near vision, or far vision, or any intermediate vision of the observer. In Figure 1, on the top of the casing 10, a large round opening is provided and through this opening the frame member 27 is assembled into the casing. The lower end of the frame member 27 forms a horizontal extension 34, Figures 1, 2 and 3, which extension is provided with a slot 35 and in this slot is mounted for sliding motion a member 36, which supports the convex lens 37, the reflector 38, and the pivoted reflector 39. Member 36 is held frictionally by a two-pronged spring 40 which exerts pressure between the sliding support 36 and the under side of the slotted frame extension 34. The underside of the sliding support 36 is provided with a transverse slot 41 which co-operates with a stud 42, Figures 1 and 3. The stud 42 is integral with a knurled wheel 43, Figures 1, 2, 3 and 10, which is mounted for rotation through a hole in the underside of the casing at 44, Figure 1.

Figure 10:
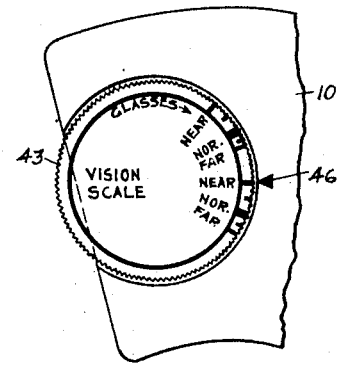
Figure 10 is a partial bottom view showing the vision scale dial.

An arcuate slot 45 also on the underside of the casing, provides clearance for the movement of the stud 42 when the knurled wheel 43 is turned by the fingers for moving the lens 41 together with the reflectors 38 and 39 toward or away from the eye of the observer. In Figure 10 the knurled wheel is shown provided with a vision scale so that the wheel may be preset with respect to the reference mark 46 on the casing 10, according to the condition of observer's eye. Two separate scales are provided; one is used when the observer wears glasses and the other scale is used without glasses. The frame member 34 is fastened to the inside of the casing by the screws 47 and 48, Figures 1 and 2.

The reflector 39 is cemented into a holder 49, two opposed sides of which are provided with short studs 50 and 51, Figures 2 and 3, which fit into holes in the side walls of the support member 36. The sides of the reflector holder straddle the lower reflector 38 which is somewhat narrower than the upper reflector 39, as shown in Figure 2, so that the reflector 39 is pivotally movable with respect to the reflector 38. One side of the reflector holder extends rearwardly and is provided with a pin 52, which is held in contact with an elongated cam member 53 by a spring 54 which is anchored to a hook projecting from the support 36, Figure 3. As the support 36 is moved by the rotation of the wheel 43, the pin 52 slides upon the slightly tapered surface 53a of the cam member 53, thereby imparting a small rocking motion to the reflector 39. As explained in my aforementioned pending application, the two virtual images of the pupil are brought into a position of tangency by the rocking movement of one of the reflectors, said movement being a measure of the pupil diameter, and hence, indicates the corresponding light intensity falling upon the eye. Hence, in moving the lens and reflector combination toward or away from the pupil for bringing the pupil images into a sharp focus, it is important that this relation of tangency be maintained, and the small rocking motion imparted to the reflector 39 as above explained is for the purpose of maintaining the relation of tangency of the pupillary images during the focusing operation. If the user wears spectacles or glasses, readings may be taken by holding the instrument in contact with the surface of the glasses, but in this case the lens and reflectors must be moved toward the eye in order to compensate for the distance between the pupil and the outside surface of said glasses. The free end of the cam member 53 is likewise provided with a slightly tapering surface 53b, co-operating with the pin 52 for imparting to the reflector 39 a compensating movement in the process of focusing in connection with the use of glasses.

Figure 6:
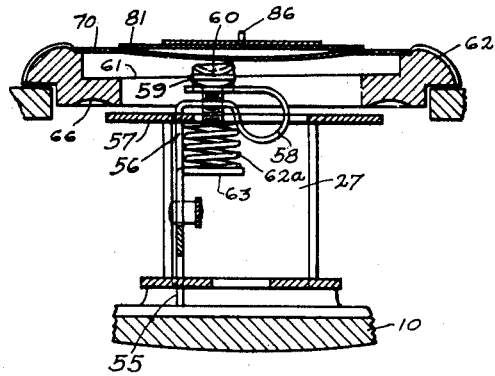
Figure 6 is a partial section taken along line 6—6 Figure 1.

To bring the pupillary images into a position of tangency, the cam member 53, Figure 3, is moved vertically, for imparting to the reflector 39 the required rocking motion. The cam member 53 is provided with a downward projection 55, Figure 3, which slides in a slot in the frame member 34. Integral with the cam member is the upward projection 56 which slides in a slot of an upper horizontal extension 57 of the frame member 27, Figures 1, 2, 3 and 6. As shown in Figure 6, the upward projection 56 is provided with a loop formation 58, which is made of a resilient material, and functions as a spring. A screw 59, Figures 1, 3 and 6, is threaded into the lower part of the loop, while the upper part of the loop presses against the underside of the head of the screw. The upper part of the loop is offset, terminating in a cupped lip 60, which rests upon a circular cam surface 61, which is an integral part of the knurled disc 62. It will be evident from Figures 3 and 6, that as the knurled disc is rotated in a horizontal plane, the cam surface 61 will impart a vertical motion to the cupped tip 60, and thereby to the elongated cam 53, which controls the rocking of the reflector 39. A spring 62a anchored on the underside of the frame member 57 and exerting a downward force upon the projection 63, tends to hold the cupped lip 60 in contact with the cam surface 61. From the above description and from Figures 1, 3 and 6 it will be apparent that by turning the screw 59 the elongated cam 53 will be raised or lowered with respect to the cam surface 61 and thereby the angular relation of the reflectors 38 and 39 may be adjusted, for the purpose of calibrating the instrument.

In calibrating, the reflectors are adjusted to register the tangency of the pupillary images in a predetermined light condition and corresponding to the average size pupil. At the calibrated point the screw head 59 is marked with a dot 64, Figure 1, opposite a reference mark 65 upon the cupped lip. The dot mark is preferably made with some paint or pigment, and its purpose is to fix the position of the calibration. The screw head 59 is further provided with graduated marks as shown in Figure 1 for the purpose of altering its position a known amount, in case the variation from the average pupil in an individual case makes this desirable.

The disc 62 is provided on its underside with an arcuate groove 66, Figure 3, which serves as a race for three spaced ball bearings, 67, 68 and 69, Figures 1, 2 and 3. The balls are supported in cup formations on the upper horizontal frame member 57, as shown at 68, Figure 3. The purpose of the ball bearings is to give proper circumferential support to the knurled disc 62 and by its antifriction properties to facilitate the operation of the knurled disc by the fingers; further, the relation of the cam surface 61 to the race 66 opposite it, can easily be fabricated with a high degree of accuracy and it is this factor which controls the rocking motion imparted to the reflector 39. A circular plate 70 rests on a recessed shoulder of the disc 62, Figure 3, and this plate is provided with a small projection 71, Figure 7, which secures said plate on the disc 62 against relative motion, so that when the knurled disc 62 is rotated, the plate 70 will move as if integral with it. At its center the plate 70 is provided with a circular aperture which fits loosely around the cylindrical body 72 of a knob 73, while a shoulder 74 on the knob 73, Figures 3 and 5, bears down on the edge of the circular aperture so that by the plate 70 and the knob 73 the knurled disc 62 is securely held in place.

The knob 73 is fastened to the frame member 57 by means of a stud 75 which fits into a hole provided in the knob 73. The stud 75 has a groove 76 and opposite this groove the knob is provided with a recess 77, Figures 3, 4 and 5, which accommodates a "horseshoe" spring 78 so that when the knob is forced down upon the stud the spring snaps in the groove on the stud and thereby retains the knob in place. A projection 79, Figure 5, fits into a hole in the frame member 57 and prevents the knob from turning. The upper surface of the knob 73 is made concave and serves as a finger rest to facilitate the holding of the instrument, and the turning of the disc 62. In Figures 1 and 3 a projection 80 in the path of a similar projection 80a on the disc 62 acts as a stop, limiting the rotation of the disc in both directions.

In Figure 7 the circular plate 70 is shown with a time scale on its outer edge. Another circular plate 81 disposed above the plate 70 is provided with a series of "stop" numbers indicating the objective aperture, which are adjacent to and are co-ordinated with the numbers of the time scale on plate 70, so that when the disc 62 is adjusted to cause the pupillary images to be brought into alignment, the adjacent pairs of numbers on the time and stop scales will indicate the correct shutter speed, and the corresponding objective aperture. During the operation of the disc 62 the stop plate 81 remains relatively fixed. The plate 81 is also provided with film speed numbers indicated in Figure 7 as "Weston speed numbers" two of which are visible through an aperture 82 on a plate 83 disposed on top of the plate 81, Figures 3, 5 and 7. The plate 83 extends under the head of the knob 73, and is formed with a downwardly projecting flange or rim 84 which is spun or crimped around a resilient friction ring 85 in such a manner that the plate 81 will be held frictionally but movable between the plate 83 and the friction ring 85.

Figure 9:
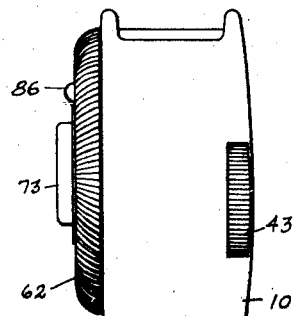
Figure 9 is a side elevation of Figure 7.

To set the stop scale to a desired film speed value, the plate 81 is rotated with respect to the aperture 82, and a projection 86 on the plate 81, Figures 7 and 9, is provided to facilitate this operation. Plate 83, Figure 7, has a semicircular part 87 cut away and the plate 81 has a similar circular portion 88 cut out in such a way, that the plate 81 may be rotated to bring the portion 88 opposite the cut out 87, thus forming at that point a circular opening which is just above the adjusting screw 59, Figure 1, and is the means by which this screw is made accessible when such an adjustment is desired. The plate 70 is provided with a similar hole or opening opposite the cut out 87, as shown in Figure 3.

Figure 4:
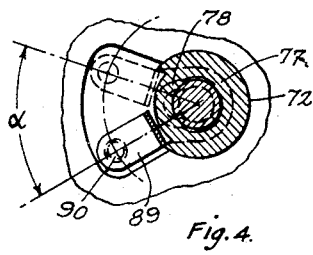
Figure 4 is a partial section taken along line 4—4 Figure 3.
Figure 5:
Figure 5 is a partial section taken along line 5—5 Figure 1.

The friction ring 85, Figures 4 and 5, has a downwardly projecting U shaped lug 89, provided on its underside with a pin 90, which co-operates with a slotted lever 91, and by means of this lever, the assembled plates 81 and 83 are imparted to it a limited degree of rotation, as shown by the angle α in Figure 4. The lever 91 is operated by the range finder dial in a manner hereinafter to be described.

The plate 83 is spun or crimped around the friction ring 85 in such a way that relative motion between them is prevented, while the plate 81 is frictionally supported between them, and carried along by them.

In Figure 17 is shown the appearance of the images of the eye when the pupillary images Q and P are in tangency. The rectangular figures A represent the images of the apertures on the two sides of the frame member 27, Figure 11, as reflected from the cornea of the eye.

The range finder is assembled in its own casing 92, Figures 1, 2 and 3, which serves as a frame or support for its various parts. It is fitted into the Bakelite casing in an inclined position as shown in Figure 2, the right side in contact with the bottom of the casing, in order that the rays and those reflected from the reflector 22 may proceed unimpeded to the right eye. A fixed reflector 93, Figures 1, 2, 11 and 12, made of transparent glass and partially silvered or coated with a reflecting material, is inclined approximately at 45° with the axis of vision and transmits the direct rays from an object to the observer's eye, Figures 11 and 12, and also reflects rays proceeding from a pivotally mounted reflector 94 which receives rays from the same object, so that the object and its virtual image produced by the two reflectors is simultaneously observed. A distant object is represented by an arrow 95, Figure 12, and its virtual image is shown at 96.

It is to be observed that the object and its virtual image are parallel and that corresponding points of object and image are equidistant in a direction perpendicular to the surface of the reflectors so that if the instrument is held horizontally, the virtual image appears parallel but somewhat above the object. In operating the range finder the pivoted reflector 94 is moved about its pivot which causes the virtual image 96 to move along the line 97 and the angular displacement of the reflector when the image and its object are superposed, is a measure of the distance of the object.

From the foregoing explanation it will be clear that the inclined position of the range finder does not cause an angular displacement of the object when observed through the reflector 93, or of its virtual image, and that it does not interfere with the coincidence of image and object.

In Figures 1 and 2 the reflector 94 is cemented in a holder which is pivotally supported in the casing 92 by the pin 98. The upper part of the reflector holder forms a lever arm 99 which extends lengthwise along the casing and is provided at its end with a roller 100 which co-operates with a cam 101. A compression spring 102 anchored on the casing presses on the lever holding the roller 100 in contact with its cam. The cam 101 is supported for free rotation upon a stud 103 which is fastened to the top of the casing 92. A knurled dial 104, Figure 7, integral with the hub of the cam, is provided with a scale of distances, which are referred to the reference mark 105.

If $u$ represents the distance of the object from the objective lens of the camera, and $f$ represents the focal length of the lens, then it can be shown that the proper "stop" number $$\phi_p = \phi \frac{u-f}{f}$$

where $\phi$ represents the correct stop number for a distant object. From the above relationship it is evident that as the distance $u$ of the object decreases, and with the increase of the focal length $f$ the proper stop number $\phi_p$ decreases, which means that the objective aperture diameter increases, and further that this change in objective aperture is simultaneously dependent on both of these quantities. In the present invention means are provided for moving the objective aperture scale relative to the time scale, with the operation of the range finder and for making adjustments corresponding to the variations in the focal length of the camera objective. It was explained in connection with Figure 5 that the lever 91 imparts a movement through the pin 90 to the plate 81 as shown by the angle α in Figure 4. In Figures 1 and 2 the lever 91 is provided with a pin or stud 106 which slides in a groove in the upper wall of the casing and its purpose is to prevent longitudinal movement of the lever. A roller 107 opposite the stud 106 co-operates with the cam 108, and a spring 109 anchored in the casing presses against the lever 91, holding the roller 107 in contact with the cam 108.

The top of the casing, Figure 1, has an elongated slot 110 in which slides the adjustable member 111; a spring 112, Figure 2, mounted on the adjustable member and pressing upon the underside of the casing wall provides friction for holding the said member in its place. The lever 91 is likewise provided with a slot 113 in which is fitted the grooved part 114 of the sliding member 111 so that said member acts as an adjustable fulcrum for the lever 91 and also supports said lever with respect to the wall of the casing.

In Figure 7 a scale "FF" is provided, which indicates the positions of the sliding member corresponding to the focal lengths of the camera objectives. The cam 108 in integral with the range finder cam 101 and with the dial 104. From Figures 1, 2 and 7 it will be evident that the angular rotation of the lever 91 is increased with the rotation of the dial 104 from its position of "ω" toward lesser distances, and further, that this movement will increase with the increase of the focal length, and therefore the movement imparted to the plate 81 will likewise be increased.

Figure 18:
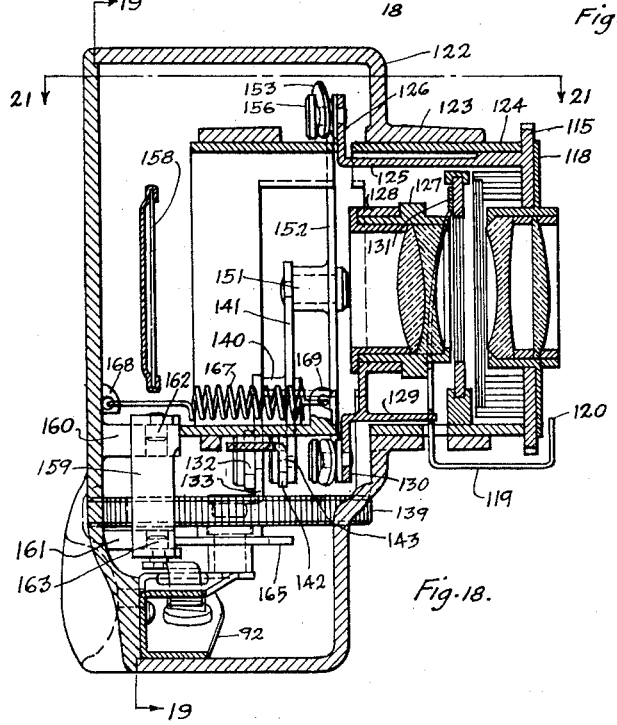
Figure 18 is a schematic sectional view along line 18—18 Figure 19, showing the adaptation of the combined exposure meter and range finder to a conventional type of hand camera.
Figure 20:
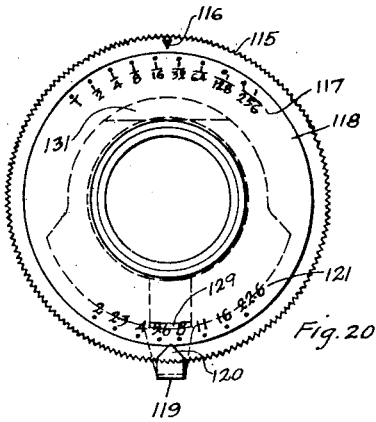
Figure 20 shows the front of the objective mounting with the shutter scale and iris diaphragm scale, and the iris diaphragm lever.

In applying the present invention directly to a conventional type of camera, the functions of the shutter and the iris diaphragm are co-ordinated by means of a control mechanism connected with the exposure meter and the range finder. In the present embodiment of the invention any well known type of shutter combined with the objective lens may be employed. In these shutters a knurled disc 115, Figures 18 and 20, is generally provided for manually setting the speed of the shutter by moving the reference mark 116 on the disc, opposite the desired fraction of a second, shown on a time scale 117 engraved on a flange 118, which is a fixed part of the objective lens mounting. The iris diaphragm is likewise manually adjusted by a U shaped lever 119 provided with a pointer or indicator 120 which is moved opposite a "stop" number on the scale 121 engraved on the flange 118. According to the present invention, the shutter disc is adjusted manually as required by the subject or scene to be photographed, and the iris diaphragm is automatically set to the proper stop by the operation of the exposure meter and of the range finder, and simultaneously the objective will be positioned by the operation of the range finder at the proper focal distance with respect to the film.

For the purposes of the present invention, to the uniform spaces represented by the dots of the time scale 117, correspond a series which forms a geometric progression, such as the series 1/2, 1/4, 1/8, 1/16, 1/32, 1/64, 1/128, and 1/256, having the constant ratio 1/2; similarly, to the uniform spaces of the "stops" scale 121, correspond a series of stop members whose squares form a geometric progression, thus:

"Stop" Nos. 22.6, 16, 11.3, 8, 5.6, 4, 2.3, 2. Squares of "stop" Nos. 512, 256, 128, 64, 32, 16, 8, 4. This last series has the constant ratio 1/2, the same as the time scale. When the two scales are thus related, any successive pairs taken from the two series will represent the same exposure, such pairs as: ½ second and f22.6, ¼ second and f16, ⅛ second and f11.3 etc.

The illustrations of the lens mountings, of the shutter and of the iris diaphragm, are schematic, and their actual structure and mechanism is not shown, since these parts form no part of the present invention and will be referred to only in general terms. The front of the camera casing 122, Figures 18, 19 and 21, has a cylindrical projection 123 which supports the tubular member 124 adapted to slide axially in it. The tubular member 124 supports the lens mountings, the shutter and the iris diaphragm, and its movement carries all of these elements with it.

The shutter disc 115 is provided with a narrow strip 125 extending rearwardly and terminating in a right angle bend 126, which projects through a slot in the tubular member 124 so that any rotational adjustment of the disc 115 is transmitted to the part 126. The shutter disc 115 is usually constructed with considerable frictional resistance so that it is firmly held in any adjusted position which also applies to the part 126. The inner lens mounting 127 has mounted on it for free rocking movement, a ring 128 which is provided on its lower side with a narrow right angled extension 129 which engages a slot in the diaphragm lever 119, Figures 18 and 20.

Figure 19:
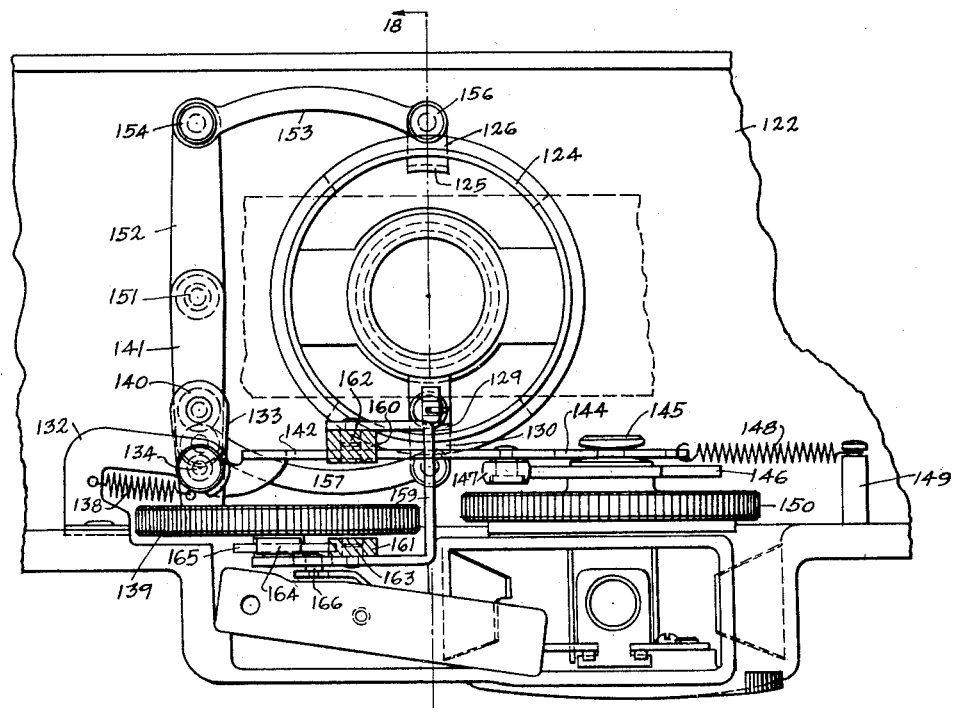
Figure 19 is a rear view in the direction 19—19 in Figure 18 with the rear part of the casing removed.

Another part 130, integral with the ring 128, projects through a slot of the tubular member 124 and is opposite the part 126, Figures 18, 19. The action of the diaphragm lever 119 as usually constructed is very light as compared with the action of the shutter disc 115, and therefore movement will be imparted to the diaphragm lever 119 through the part 130 and opposed against the resistance of the part 126, in a manner hereinafter to be described.

The diaphragm lever 119 is made of a resilient material and fastened to a rotating member of the iris diaphragm at 131, Figures 18 and 19, so that said lever may be pulled forward and disengaged from the part 129 in case it is desired to adjust the iris diaphragm manually.

Figure 24:
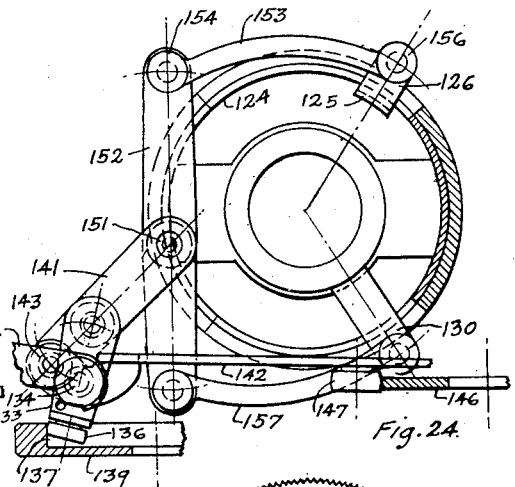
Figure 24 shows the control mechanism in another operative position.

The control mechanism connects the parts 126 and 130 with the exposure meter and range finder. In Figures 18, 19, 20 and 21, the shutter is set for mid position and the "stop" indicator 120 is likewise in mid position. The control mechanism consists essentially of three interconnected pivoted levers, one of which has its pivot fixed with reference to the frame or casing of the camera, while the other two levers have movable or "floating" pivots. These levers co-operate or are connected by links with the range finder cam, the exposure meter cam, and parts 126 and 130 in such a way, that the positioning of the part 130 and of the iris diaphragm results from the combined operation of the range finder and of the exposure meter. In Figures 18, 19 and 21, 132 is bracket-fastened to the frame or casing of the camera and it pivotally supports a lever 133 at 134. On the lower end of this lever a right angled bend 135 is provided with a convex roller 136 which co-operates with the internal cam 137 best shown in partial section in Figures 22 and 24.

A spring 138 anchored to the bracket 132 pulls on the lever 133 and holds the roller 136 in contact with the cam 137. The internal cam 137 is part of the knurled disc 139, Figures 18, 19 and 21, which is pivotally supported on the range finder casing and takes the place of the dial 104 in Figure 7. The knurled disc 139 projects partially through the camera casing, Figure 18, so it can be rotated by the fingers. The upper end of the lever 133 is provided with a hub 140 which serves as a pivotal support for another lever 141. The lower end of the lever 141 is pivotally connected to a sliding link member 142 as shown at 143, Figures 18, 19, 22 and 24. The link 142 is provided with a slot 144 which is fitted for sliding motion in a groove formed on the stud 145, Figures 19 and 21. The sides of the groove are convex so as to allow the link to have a small up and down movement imparted to it by the lever 141.

Figure 21:
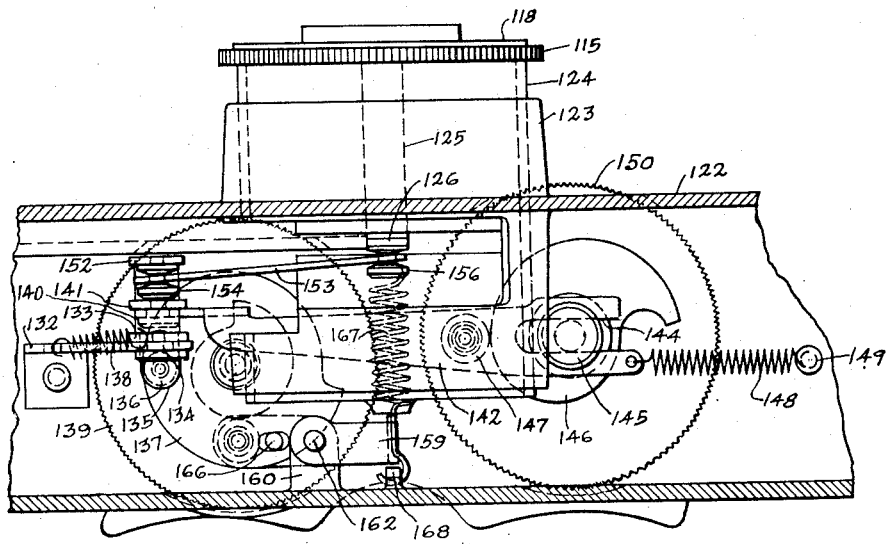
Figure 21 is a partial sectional top view along line 21—21 Figure 18.

A convex roller 147 is pivotally fastened to the link 142 and co-operates with a cam 146 and a spring 148 anchored to a stud 149 on the camera casing, pulls on the link and holds the roller 147 in contact with the cam 146. A knurled disc 150 integral with the cam 146 partially projects out of the casing, as shown in Figure 21, where it may be rotated by the fingers. The disc 150 takes the place of the plate 70, Figure 3, and the structure of the lower part of the stud 145, Figure 19, is similar to that of the knob 73. All other parts of the exposure meter remaining essentially the same.

The upper end of the lever 141 is pivotally connected at 151 to another lever 152, Figures 18, 19, 21, 22 and 24. The upper end of the lever 152 is connected by a link 153 to the part 126 by the grooved studs 154 and 156, and the grooves in these studs are tapered, Figure 21, so that the axial movement of the part 126 during the focusing operation of the objective will not interfere with the action of the link 153. A similar link 157 connects the lower end of the lever 152 to the part 130.

Figure 22:
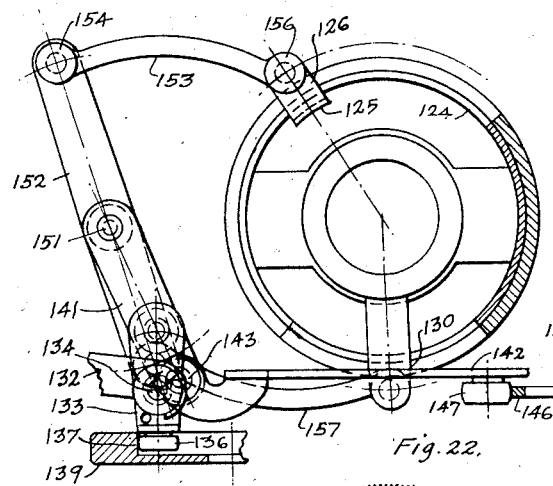
Figure 22 is a partial rear view showing the control mechanism between the shutter and the iris diaphragm.
Figure 23:
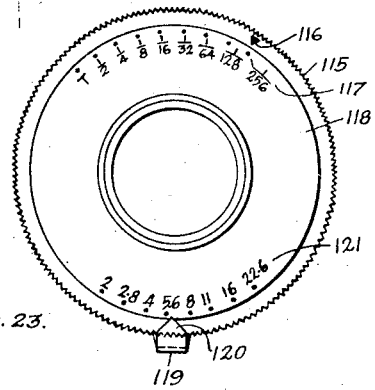
Figure 23 shows the objective mounting and the setting of the shutter and of the iris diaphragm corresponding to the operative position of the control mechanism in Figure 22.

The operation of the control mechanism above described is best illustrated in Figures 22 to 25. In Figure 23 the shutter disc is set for the highest speed of $\frac{1}{256}$ of a second and the corresponding position of the part 126 is shown in Figure 22. The range finder cam 137 is set for an intermediate distance of the object which positions the lever 133 as shown. The exposure meter cam 146 is set for a highly illuminated object which determines the position of the sliding link 142 and through it the position of the lever 141. The lever 141 through its upper pivot 151 acts on the lever 152 against the resistance of the upper link 153 and through the lower link 157 moves the part 130. The result is the positioning of the iris diaphragm indicator as shown at 120, Figure 23, which represents the correct "stop" in relation to the preset time, shown at 116.

Figure 25:
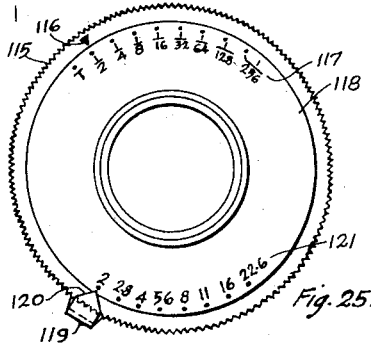
Figure 25 shows the objective mounting and the setting of the shutter and of the iris diaphragm corresponding to the operative position of the control mechanism in Figure 24.

In Figure 25 the shutter disc is set for the lowest speed of ½ second; the range finder is set for a near object, the exposure meter for a poorly illuminated object, and the result is the positioning of the iris diaphragm as shown at 120, in Figure 25, which represents the correct time and stop relation in this case. If the shutter were set in this latter case to a higher speed, say $\frac{1}{16}$ of a second, then the "stop" or aperture opening required would be beyond the range of the camera objective, and therefore the limiting position of the iris diaphragm lever would interfere with completing the operation of the exposure meter.

The film is shown at 158, Figure 18, and mechanism is provided for positioning the objective with respect to the film, with the operation of the range finder disc 139. Toward this end, a U shaped lever 159, Figures 18, 19 and 21, is pivotally supported on the spaced lugs 160 and 161 at 162 and 163. The lower arm of the lever 159 is provided with a roller 164 which co-operates with the cam 165, said cam being integral with the knurled disc 139. The vertical part of the lever 159 is in contact with the lower edge of the sliding cylindrical support 124, Figure 18, and a spring 167, anchored to a lug 168 on the casing and to the hook 169 pulls the sliding tube 124 against the lever 159 and holds the roller 164 against the cam 165. Since the objective is rigidly mounted in the sliding tube 124 it follows that the operation of the range finder disc 139 will position said objective through the operation of the cam 165 and lever 159 according to the distance of the object. The reflector lever is provided with a stud 166 which projects through an elongated slot in the lower arm of the lever 159, Figures 19 and 21, for imparting motion to the movable reflector 94, Figures 1, 2 and 11.

While the preferred forms of the invention have been shown and described herein, it is to be understood that various changes may be made in the details of construction and in the combination and arrangement of the several parts, within the scope of the claims, without departing from the spirit of this invention.

What I claim as new is:

1. In combination with an exposure meter adapted to measure illumination, a time scale, a stop scale, means for adjusting the relation of said scales in accordance with the illumination of the object, a range finder, and connection between the exposure meter and the range finder for modifying the relation of said scales in accordance with the distance of the object.

2. In combination with an exposure meter adapted to determine the exposures for cameras, a time scale, a stop scale, means for adjusting the relation of said scales in accordance with the light value of the object, a range finder, and connection between the exposure meter and the range finder for modifying the relation of said scales in accordance with the distance of the object and the focal length of the camera objective.

3. In combination with a camera, a shutter adjustable with respect to time values, a diaphragm adjustable with respect to stop values, connection between the shutter and said diaphragm, a range finder, and co-operating means between the range finder and said connections for adjusting the relation between the shutter and said diaphragm in accordance with the distance of the object.

4. In combination with a camera a film and an objective, a shutter adjustable with respect to time values, a diaphragm adjustable with respect to stop values, connection between the shutter and said diaphragm; a range finder, co-operating means between the range finder and said connections for adjusting the relation between the shutter and said diaphragm, and means for simultaneously positioning the objective relative to the film in accordance with the distance of the object.

5. In combination with a camera, a shutter adjustable with respect to time values, a diaphragm adjustable with respect to stop values, connection between the shutter and said diaphragm, means for determining the illumination of an object, said means co-operating with said connections for adjusting the relation between the shutter and the diaphragm, and a range finder adapted to modify said relation in accordance with the distance of the object.

6. In combination with a camera, a film and an objective, a shutter adjustable with respect to time values, a diaphragm adjustable with respect to stop values, connection between the shutter and said diaphragm, means for determining the illumination of an object, said means co-operating with said connections for adjusting the relation between the shutter and the diaphragm, and a range finder adapted to modify said relation and simultaneously position the objective relative to the film in accordance with the distance of the object.

7. In combination with an exposure meter adapted to measure the diameter of the pupil of the eye, a time scale, a stop scale, and means for adjusting the relation of said scales to correspond to the diameter of the pupil; a range finder, and means for modifying the relation of said scales by the range finder in accordance with the distance of the object.

8. In combination with an exposure meter adapted for use with a camera, a time scale, a stop scale, and means for measuring the diameter of the pupil of the eye by adjusting the relation of said scales; a range finder, and connection between the exposure meter and the range finder, adapted to modify the relation of said scales according to the distance of the object and the focal length of the camera objective.

9. In combination with an exposure meter adapted for use with a camera and comprising adjustable time and stop scales; a range finder, connection between one of said scales and the range finder for adjusting the relation of said scales in accordance with the distance of the object, and the focal length of the camera objective; and manually adjustable means for adapting said connection to objectives of various focal lengths.

10. In combination with an exposure meter and a range finder, a viewing aperture for the exposure meter and another viewing aperture for the range finder, said viewing apertures being adapted to be used simultaneously with the two eyes, for the determination of both the light value and the distance of the object, and a cooperative connection between the exposure meter and the range finder, whereby the determination of the exposure is modified according to the distance of the object.

11. In combination with a camera, an exposure meter and a range finder; a viewing aperture for the exposure meter and another viewing aperture for the range finder, said viewing apertures being adapted to be used simultaneously with the two eyes, for the determination of both the light value and the distance of the object, and cooperative means between the camera, the exposure meter, and the range finder, whereby the determination of the exposure is modified according to the distance of the object.

12. In combination with an exposure meter comprising adjustable time and stop scales, means for adjusting the relation of said scales according to the light value of the object; a range finder, a knob for operating the range finder, a cam adapted to be moved by said knob, and cooperative connection between the cam and one of said scales.

13. In combination with an exposure meter comprising adjustable time and stop scales, means for adjusting the relation of said scales according to the illumination of the object, a range finder, a knob for operating the range finder, a cam in operative connection with said knob, and a lever adapted to transmit motion from the cam to one of said scales.

14. In combination with a camera having an adjustable shutter and an adjustable diaphragm, an exposure meter, means for operating the exposure meter; a range finder, independent means for operating the range finder; and cooperative connection between the shutter, the diaphragm, the exposure meter and the range finder, whereby the relation of the shutter and the diaphragm are influenced by the operation of the exposure meter and by the operation of the range finder.

15. In combination with a camera having an adjustable shutter and an adjustable diaphragm, cooperative connection between the shutter and said diaphragm, an exposure meter, a knob for operating the exposure meter, a range finder and another knob for operating the range finder, a separate cam connected to each of said knobs, and means for adjusting the connection between the shutter and the diaphragm by the operation of one or both of said cams.

16. In combination with an exposure meter adapted for use with a camera and comprising adjustable time and stop scales, means for adjusting the relation of said scales according to the illumination of the object, a range finder, a knob for operating the range finder, a cam connected to said knob, a lever cooperating with the cam and one of said scales, a movable fulcrum for said lever, and means for adjusting said fulcrum in accordance with the focal length of the camera objective.

17. In combination with a camera having an adjustable shutter and an adjustable diaphragm, an exposure meter, means for adjusting the exposure meter according to the light value of the object, a range finder, means for adjusting the range finder to position the camera objective to correspond to the distance of the object, means for manually adjusting the shutter to operate at a predetermined period of exposure, and cooperative connection between the shutter, the diaphragm, the exposure meter and the range finder, whereby the diaphragm opening is simultaneously dependent upon the adjustments of the exposure meter, the range finder and the shutter.

NICHOLAS MILLER.